United States Patent [19]

Bernardi

[11] Patent Number: 4,715,238

[45] Date of Patent: Dec. 29, 1987

[54] STARTER DEVICE FOR INTERNAL COMBUSTION ENGINES

[75] Inventor: Guido Bernardi, Milan, Italy

[73] Assignee: B.C.S. S.p.A., Milan, Italy

[21] Appl. No.: 934,018

[22] Filed: Nov. 24, 1986

[30] Foreign Application Priority Data

Nov. 25, 1985 [IT] Italy .............................. 22979 A/85

[51] Int. Cl.[4] ............................ F02N 5/02; F03G 1/00

[52] U.S. Cl. ................................................ 74/6; 74/2; 74/89.17; 123/179 S; 185/10; 185/39

[58] Field of Search ............................... 74/2, 6, 89.17; 123/179 S, 179 T; 185/10, 39

[56] References Cited

U.S. PATENT DOCUMENTS

| | | | |
|---|---|---|---|
| 725,955 | 4/1903 | Graham et al. | 74/6 X |
| 1,043,399 | 11/1912 | Cole | 74/6 X |
| 1,330,092 | 2/1920 | Reynolds | 74/6 X |
| 1,487,503 | 3/1924 | Ziska, Jr. | 74/6 |
| 1,632,264 | 6/1927 | Avis | 123/179 T |
| 1,879,130 | 9/1932 | Diago | 74/6 |
| 2,109,281 | 2/1938 | Bosma | 74/6 |
| 2,624,424 | 1/1953 | Kliewer, Sr. | 123/179 S |

*Primary Examiner*—Allan D. Herrmann

*Attorney, Agent, or Firm*—Wolf, Greenfield & Sacks

[57] ABSTRACT

The device comprises a first pinion to be coupled to the motor shaft of the engine, and a pair of racks engaging opposite sides of the first pinion. A pair of springs, each engage one of the two racks for moving the racks to start the motor. The direction of thrust of the first of the springs against its rack is opposite to the direction of thrust of the second of the springs against its rack. The second pinion engages the two racks and is rotated by a manual start-up device to load the springs so that, when released, the springs can move the racks to start the motor.

13 Claims, 7 Drawing Figures

STARTER DEVICE FOR INTERNAL COMBUSTION ENGINES

The present invention relates to a starter device for endothermal e.g. internal combustion engines, particularly but not exclusively suitable for starting engines mounted on agricultural machines.

For starting engines, devices are well known which employ a pull-cord or an electric motor combined with a battery. However, such pull-cord system is physically very demanding and often does not allow the ignition of the engine.

The battery system, besides, is relatively heavy considering the battery and the electric starter motor, and is not suitable for agricultural machines used seasonally, since, from one season to the next, the battery tends to deteriorate.

In order to overcome these disadvantages, elastic- and spring-loaded starters have been proposed. However, it has been observed in practice that elastics do not withstand the various operating temperatures and tend to break with the cold and stretch excessively in the heat, while spring-loaded starters have an excessively high overall weight, which prevents their practical use.

An aim of the present invention is to allow the production of a spring-loaded starter of very small weight and dimensions.

Another aim of the present invention is to provide a starter which does not require particular maintenance or care and that is easy and quick to assemble.

A further aim is to provide a starter which provides improved reliability of start up of the engine even in adverse weather conditions.

A further aim of the present invention is to allow the possibility of leaving the startup crank in its seat.

Not the least of the aims of the present invention is to allow a simple and practical coupling between the motor and the starter.

These and other aims are achieved by the starter device for endothermal or internal combustion engines according to the invention. The device comprises a first pinion to be coupled to the motor shaft of the engine. A pair of racks are provided for engaging said first pinion on two opposite sides. A pair of springs are provided for moving the racks to start the motor, each engaging one of the racks. The direction of thrust of the first of said springs against the respective rack is opposite to the direction of thrust of the second of said springs against the respective rack. A second pinion engages the racks, and a manual start up means operates the second pinion to load the springs.

Further characteristics and advantages of the present invention will become better apparent from the description of a preferred, but not exclusive, embodiment of the device, illustrated only by way of example in the accompanying drawings in which.

Figure 1:
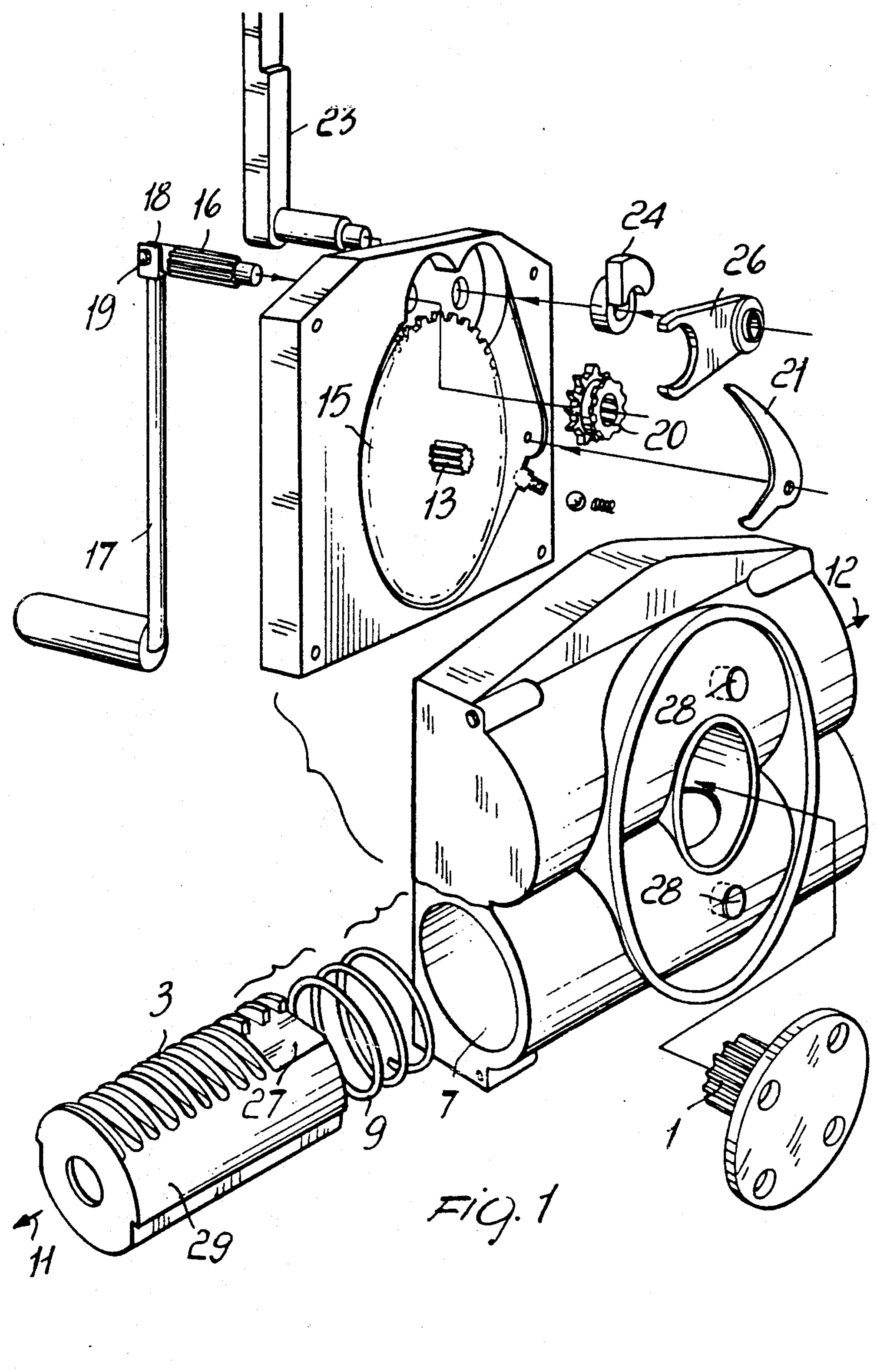
FIG. 1 is an exploded perspective view of the device.
Figure 3:
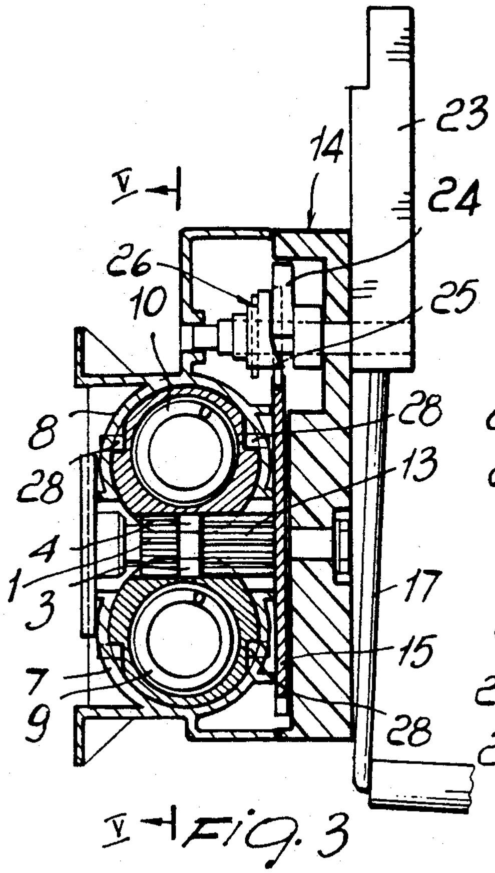
FIG. 3 is a lateral cross section view of the device during the spring loading phase.
Figure 4:
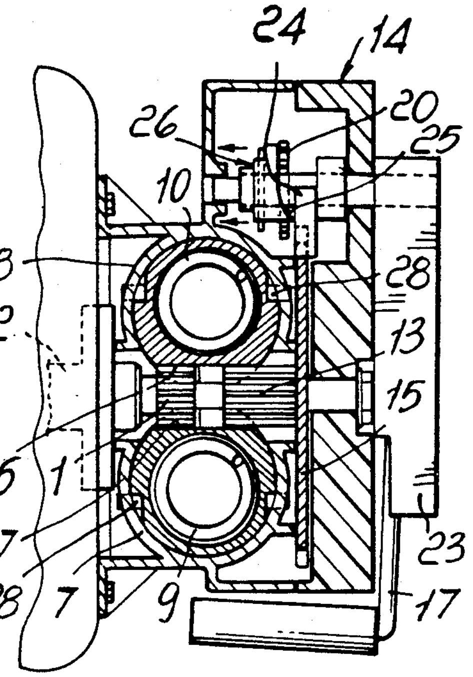
FIG. 4 is the same lateral cross section view of FIG. 3 during the engine startup phase.
Figure 2:
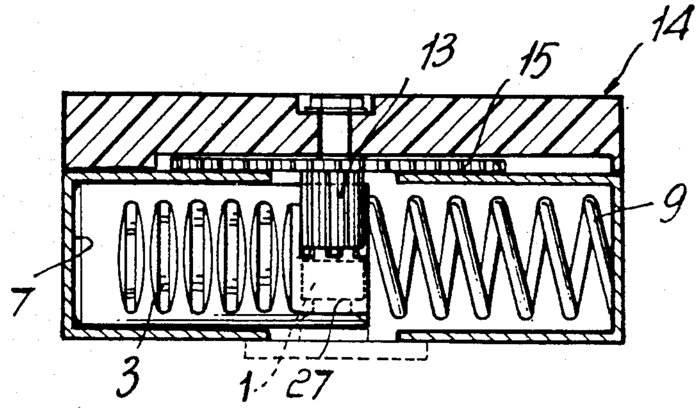
FIG. 2 is a top cross section view of the device.
Figure 5:
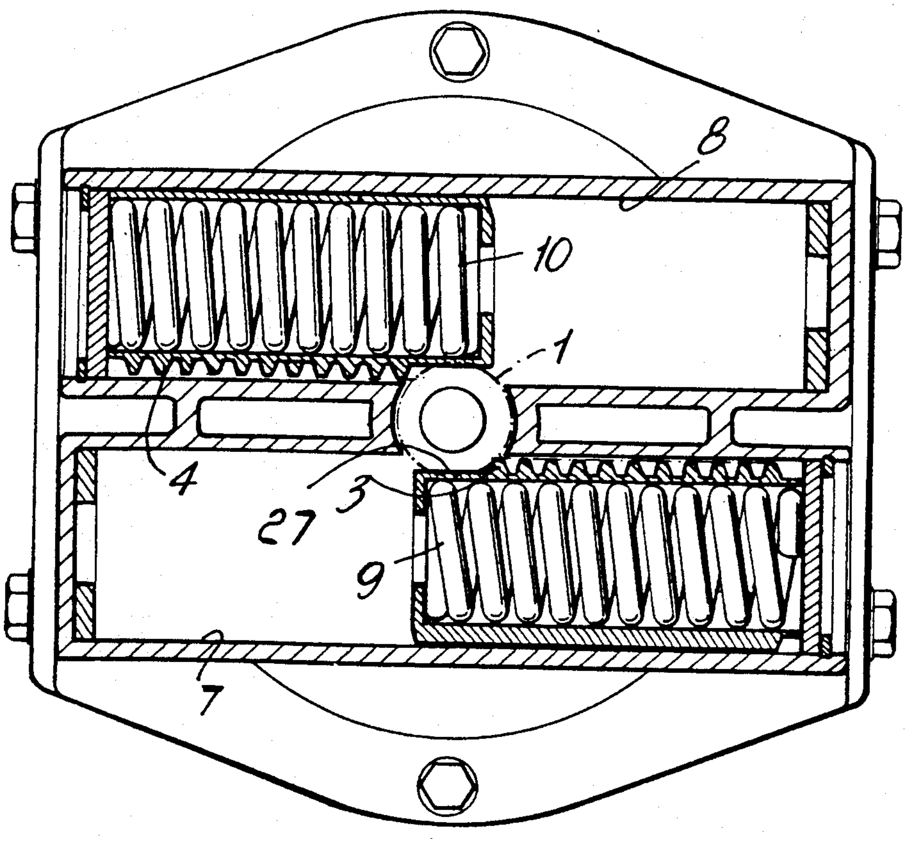
FIG. 5 is a cross section along the line V—V of FIG. 3.
Figure 6:
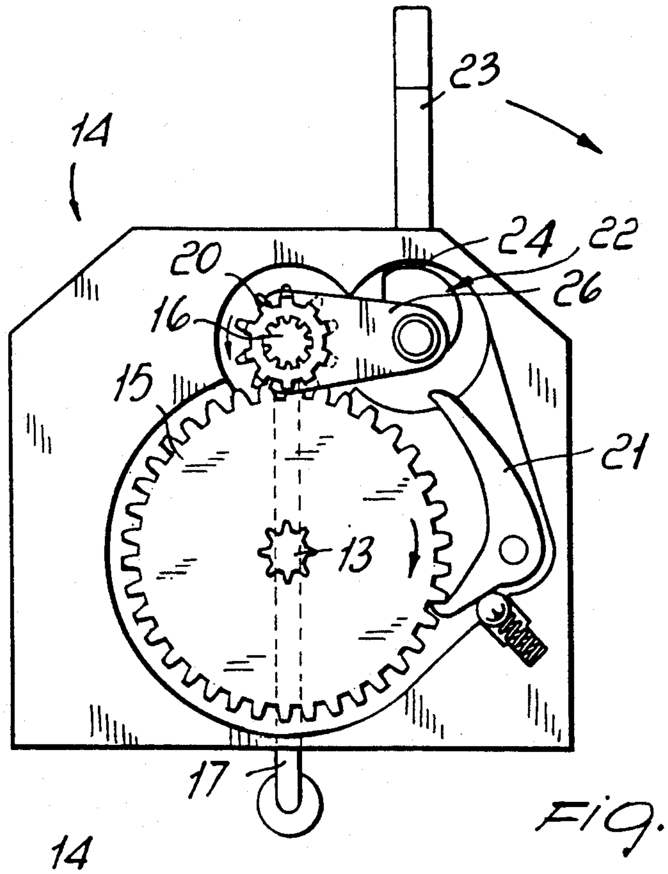
FIG. 6 is a front view of the manual startup means during the spring loading phase.
Figure 7:
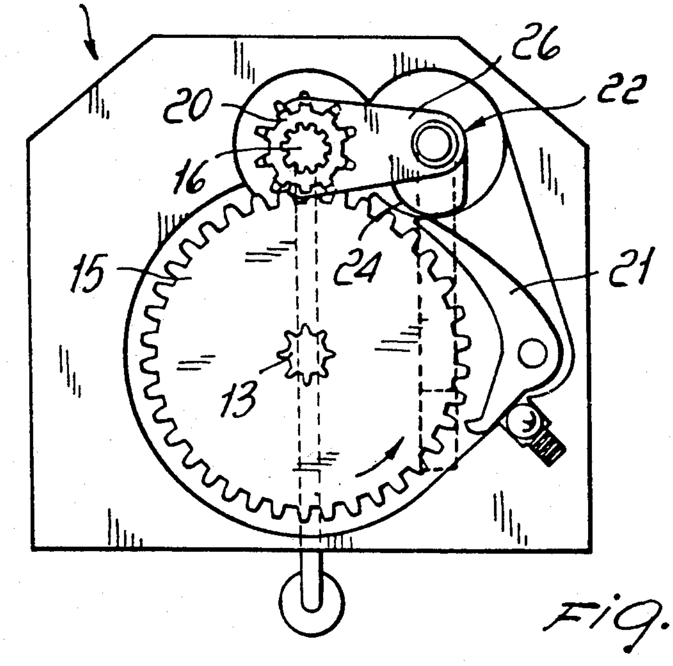
FIG. 7 is the same view of FIG. 6 during the device startup phase.

With reference to the FIGS. 1 to 7, the device comprises a first pinion 1 to be connected axially directly to the motor shaft 2 of the endothermal (or internal combustion) engine.

The pair of racks 3 and 4 engages the first pinion 1 on the two opposite sides 5 and 6. The racks 3 and 4 are slideable within suitable guides 7 and 8 of metal, e.g. aluminum.

The springs 9 and 10 engage the racks 3 and 4. The direction of the thrust of the first spring 9 against the rack 3 is directed according to the arrow 11 and is opposite to the thrust, directed according to the arrow 12, of the second spring 10 against the rack 4.

According to a preferred embodiment, in order to increase the power of the device, it is possible to employ a plurality of concentric springs inside each spring 9 and 10.

A second pinion 13 engages the racks 3 and 4 and is operated by manual startup means 14.

The manual startup means 14 comprise a toothed wheel 15, which is rigidly coupled to the second pinion 13. The toothed wheel 15 is engaged by a third pinion 16 which is connected to a crank 17. The crank 17 is connected to the pinion 16 by means of a hinge 18, which allows the rotation of the crank around the pin 19 for folding the crank 17 into a resting position.

The coupling between the third pinion 16 and the toothed wheel 15 preferably comprises a fourth pinion 20, which is keyed on the third pinion 16. This keying prevents the rotation of the fourth pinion 20 with respect to the third pinion 16, but allows free axial relative motion between the third and the fourth pinions 16 and 20. The axial motion of the fourth pinion 20 with respect to the third pinion 16 allows control of the engagement and disengagement of the toothed wheel 15 with the fourth pinion 20. A compression spring is provided which urges the pinion 20 into engagement with the toothed wheel 15.

The manual startup means 14 furthermore comprise a ratchet 21 which engages the toothed wheel 15.

The manual startup means 14 also comprises the control means 22 which simultaneously engage the ratchet 21 and the fourth pinion 20.

The operation of the control means 22 simultaneously causes the uncoupling of the toothed wheel 15 both from the ratchet 21 and from the fourth pinion 20.

The control means 22 comprise a rotatable handle 23 which supports a first cam 24 which engages the ratchet 21 and a second cam 25 which engages a fork 26 which in turn engages the fourth pinion 20.

With respect to the axis of rotation of the handle 23, the first cam 24 extends radially and engages and uncouples the ratchet 21 according to the rotation of the handle 23. The second cam 25 extends axially and controls, again by virtue of the rotation of the handle 23, the axial motion of the fork 26 which, in turn, supports the fourth pinion 20, which is thus shifted matchingly in an axial direction along the third pinion 16 against the urging of the compression spring (not shown) which urges the pinion 20 into engagement with the toothed wheel 15.

The first and the second pinions 1 and 13 are arranged coaxially; both racks are devoid of teeth in the portion 27, which is occupied by the first pinion 1 in the resting position, when the racks are at the end of their stroke and the springs are relaxed, so that when the motor is started the pinion 1 can continue its rotation rigidly with the motor shaft, without interfering with the racks.

Each of the racks 3 and 4 is supported by at least one pair of pins 28 of plastic material, these pins engaging rectilinear seats provided on the racks.

According to a preferred embodiment, each of the racks 3 and 4 is supported by a cylindrical cup 29, which slideable within the guide 7. The bottom of the cup 29 engages the matching spring.

The pins 28 thus prevent the rotation of the cups 29 around their axis and the racks 3 and 4 are constantly kept perpendicular to the axis of the pinions 1 and 13.

At the end of the stroke, when the springs are unloaded, at the second pinion 13, the teeth of the racks 3 and 4 are present, so that it is possible, by virtue of the action of the crank 17, to operate the second pinion 13 and therefore simultaneously load both springs 9 and 10 with the motor switched off.

When the springs are completely loaded, by acting on the handle 23 it is possible to free the rotation of the toothed wheel 15 and thus allow the energy accumulated by the springs 9 and 10 to discharge, giving rise to the rotation of the first pinion 1 and thus starting the motor.

During this phase of spring discharge and toothed wheel 15 rotation, the coupling of the crank 17 is freed by the axial motion of the fourth pinion 20, so that the violent counter-rotation of the crank 17 is not allowed, which crank is instead free from the toothed wheel 15. Particularly, the crank 17 need never be removed, but is stored in the resting position illustrated in FIG. 4.

In practice, it has been observed that the illustrative device described hereinbefore achieves all the aims intended and, in particular, does not require the use of bearings which support the coupling between the racks 9 and 10 and the first pinion 1. This gives rise to a particularly lightweight embodiment, easy to assemble, with limited costs and very compact in size.

I claim:

1. Starter device for an endothermal engine having a motor shaft, comprising:
- a first pinion to be connected axially directly to the motor shaft of the endothermal engine;
- a pair of slideable racks for engaging said first pinion on opposite sides thereof;
- a pair of spring means, each engaging one of said two racks, the direction of thrust of the first of said springs against its respective rack being opposite to the direction of thrust of the second of said springs against the respective rack;
- manual start up means; and
- a second pinion engaging said two racks and operated by the manual startup means.

2. Device according to claim 1, wherein said manual startup means comprise a toothed wheel rigidly coupled to said second pinion; said toothed wheel being coupled to a third pinion connected to a crank.

3. Device according to claim 2, wherein the connection between said third pinion and said crank comprises a hinge.

4. Device according to claim 2, wherein the coupling between said third pinion and said toothed wheel comprises a fourth pinion: said fourth pinion being drivingly engaged with said third pinion and being axially movable with respect to the axis of said third pinion; the axial motion of said fourth pinion allowing control of the engagement and disengagement of the fourth pinion with the toothed wheel.

5. Device according to claim 4, said manual startup means further comprise a ratchet engaging said toothed wheel.

6. Device according to claim 5, wherein said manual startup means comprise control means engaging simultaneously said ratchet and said fourth pinion, so that the actuation of said control means causes at the same time the uncoupling from said toothed wheel both of said ratchet and of said fourth pinion.

7. Device according to claim 6, wherein said control means comprise a rotatable handle supporting a first cam engaging said ratchet and a second cam coupled to said fourth pinion.

8. Device according to claim 7, wherein with respect to the axis of rotation of said rotatable handle, said first cam has a radial extension for engaging the ratchet and said second cam has an axial extension for urging the fourth pinion axially.

9. Device according to claim 2, wherein said first and said second pinion are arranged coaxially, both said racks being devoid of teeth in the portion occupied by said first pinion when the racks are in the position in which the springs are relaxed.

10. Device according to claim 1, wherein each of said racks is supported by at least one pair of pins of plastic material; said pins engaging suitable rectilinear seats provided on said racks.

11. Device according to claim 1, wherein each of said racks is supported by a cylindrical cup slideable inside a cylindrical guide; the bottom of said cup engaging the corresponding spring.

12. A starter device for an internal combustion engine which has a motor shaft, comprising
- a first toothed gear for coupling to the motor shaft,
- a pair of racks engageable with opposite sides of the first gear and moveable in opposite directions to rotate the first gear,
- a pair of spring means engaged to the respective racks for urging the racks in the said opposite directions to rotate the first gear,
- a second toothed gear engaged with the racks,
- and manually actuated means for rotating the second gear to move the racks and thereby load the springs to that when released, the racks cause the first gear, and thus the motor shaft, to rotate.

13. A device according to claim 12 comprising cylindrical guide members and wherein the racks are provided on cylindrical rack support members, and the cylindrical members are slideable within and supported by the cylindrical guide members.

* * * * *